No. 705,813. Patented July 29, 1902.
J. A. ARNOLD.
APPARATUS FOR FORMING GLASS ARTICLES.
(Application filed May 22, 1901.)

(No Model.) 6 Sheets—Sheet 1.

Witnesses:
Chas. S. Lepley
R. F. Sample

Inventor:
James A. Arnold
by C. M. Clarke
his Attorney.

THE NORRIS PETERS CO., PHOTO-LITHO., WASHINGTON, D. C.

No. 705,813. Patented July 29, 1902.
J. A. ARNOLD.
APPARATUS FOR FORMING GLASS ARTICLES.
(Application filed May 22, 1901.)
(No Model.) 6 Sheets—Sheet 2.
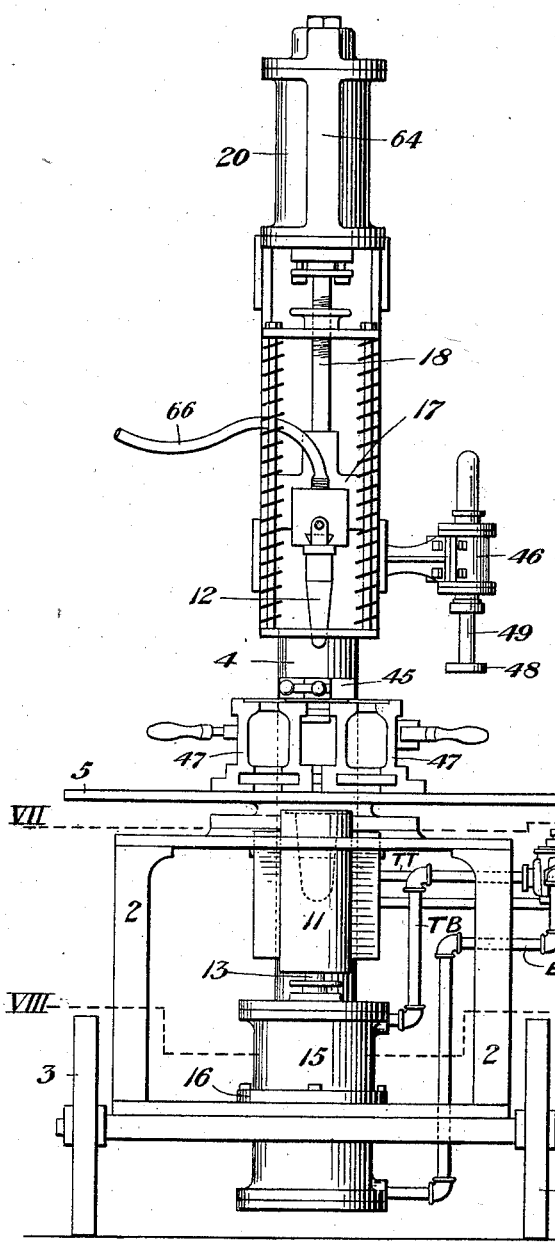
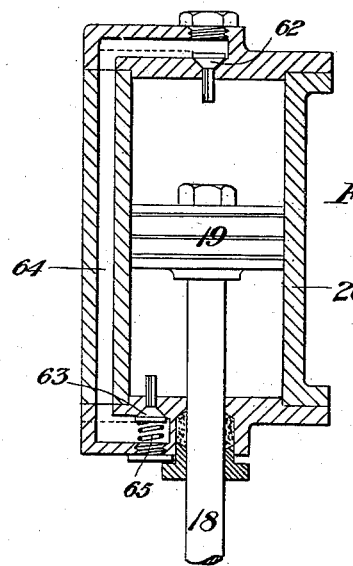
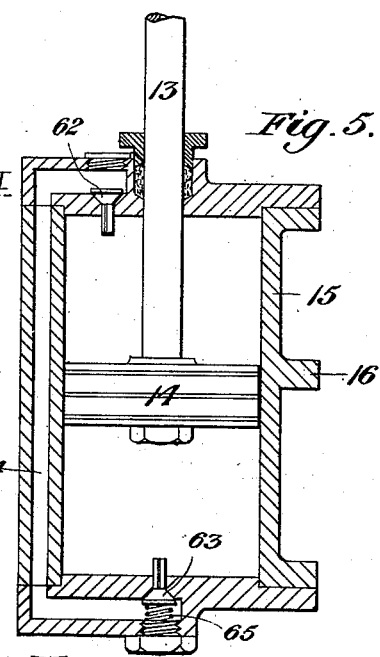
Witnesses:
Inventor:

No. 705,813. Patented July 29, 1902.
J. A. ARNOLD.
APPARATUS FOR FORMING GLASS ARTICLES.
(Application filed May 22, 1901.)
(No Model.) 6 Sheets—Sheet 3.

Witnesses: Inventor:

No. 705,813. Patented July 29, 1902.
J. A. ARNOLD.
APPARATUS FOR FORMING GLASS ARTICLES.
(Application filed May 22, 1901.)
(No Model.) 6 Sheets—Sheet 4.
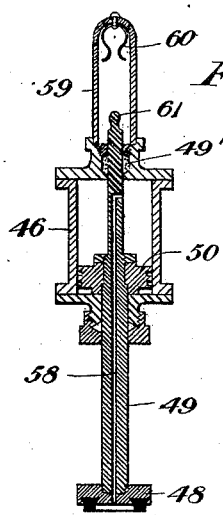
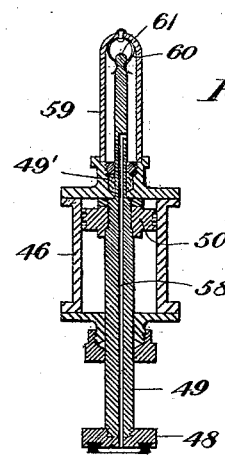
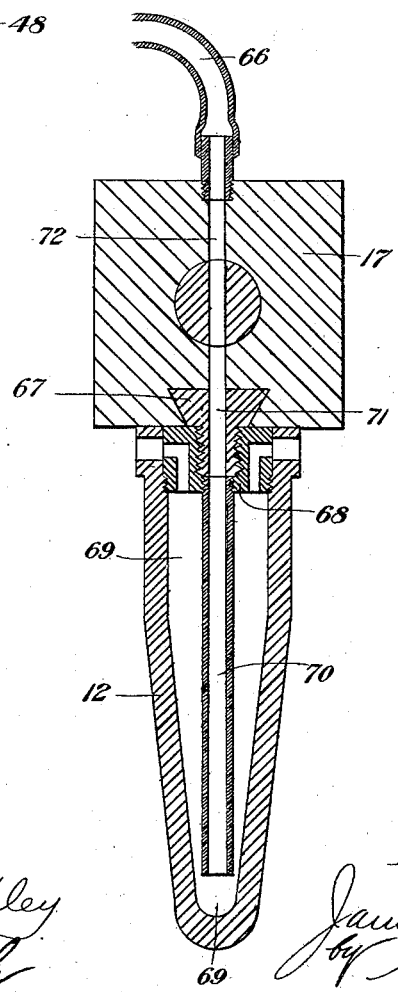
Witnesses:
Chas. S. Lepley
R. F. Sample
Inventor:
James A. Arnold
by O. M. Clarke
his Attorney.

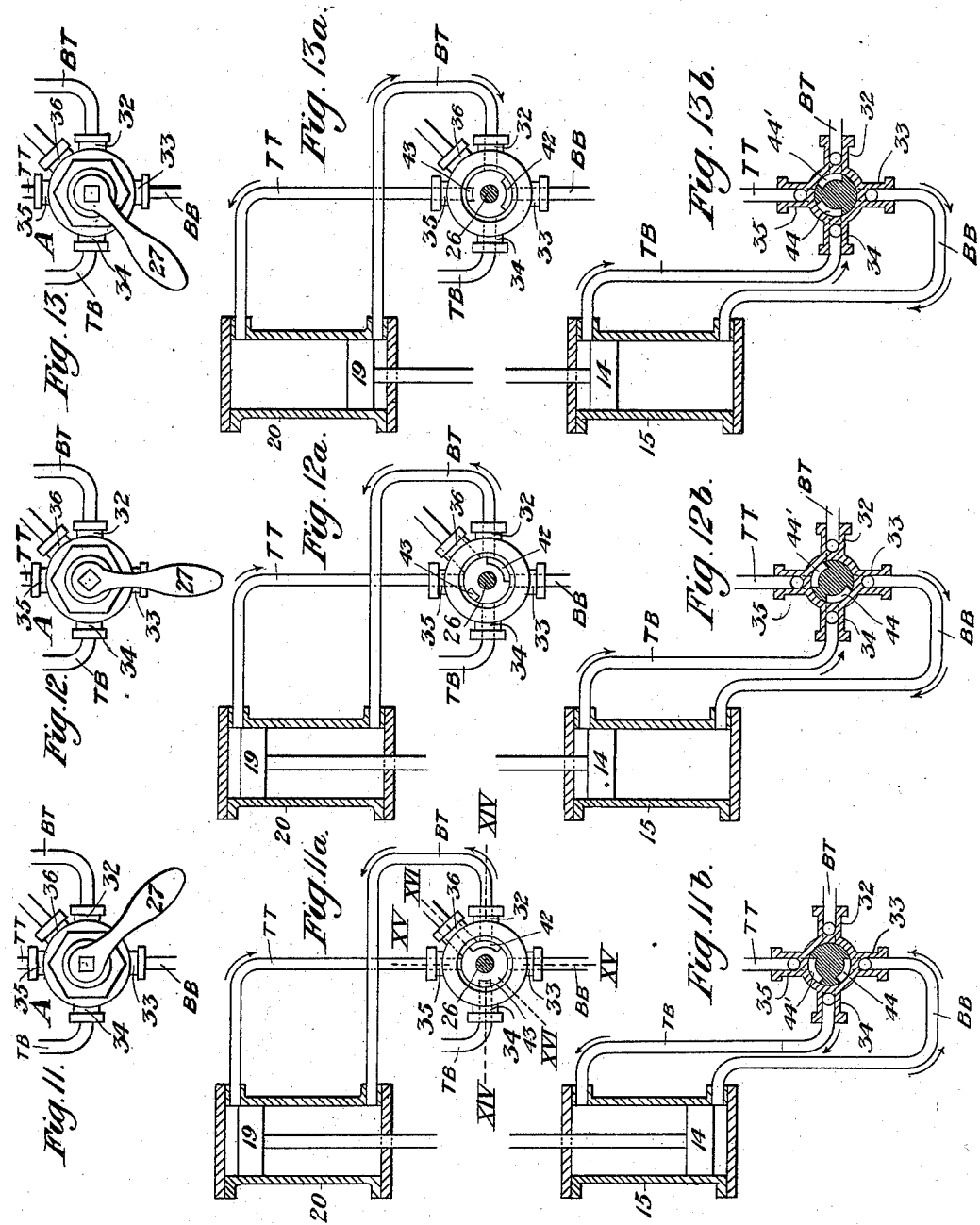

No. 705,813. Patented July 29, 1902.
J. A. ARNOLD.
APPARATUS FORMING GLASS ARTICLES.
(Application filed May 22, 1901.)
(No Model.) 6 Sheets—Sheet 6.

UNITED STATES PATENT OFFICE.

JAMES A. ARNOLD, OF ALLEGHENY, PENNSYLVANIA.

APPARATUS FOR FORMING GLASS ARTICLES.

SPECIFICATION forming part of Letters Patent No. 705,813, dated July 29, 1902.

Application filed May 22, 1901. Serial No. 61,424. (No model.)

*To all whom it may concern:*

Be it known that I, JAMES A. ARNOLD, a citizen of the United States, residing at Allegheny, in the county of Allegheny and State of Pennsylvania, have invented certain new and useful Improvements in Apparatus for Forming Glass Articles, of which the following is a specification, reference being had therein to the accompanying drawings, forming part of this specification, in which—

Figure 1:
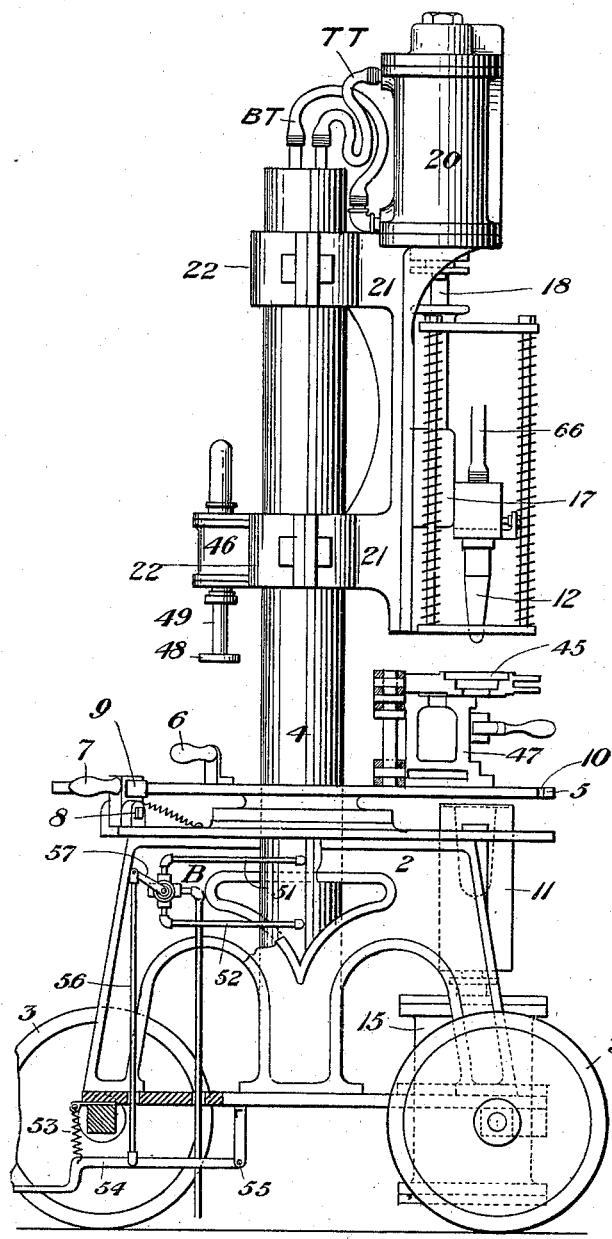
Figure 2:
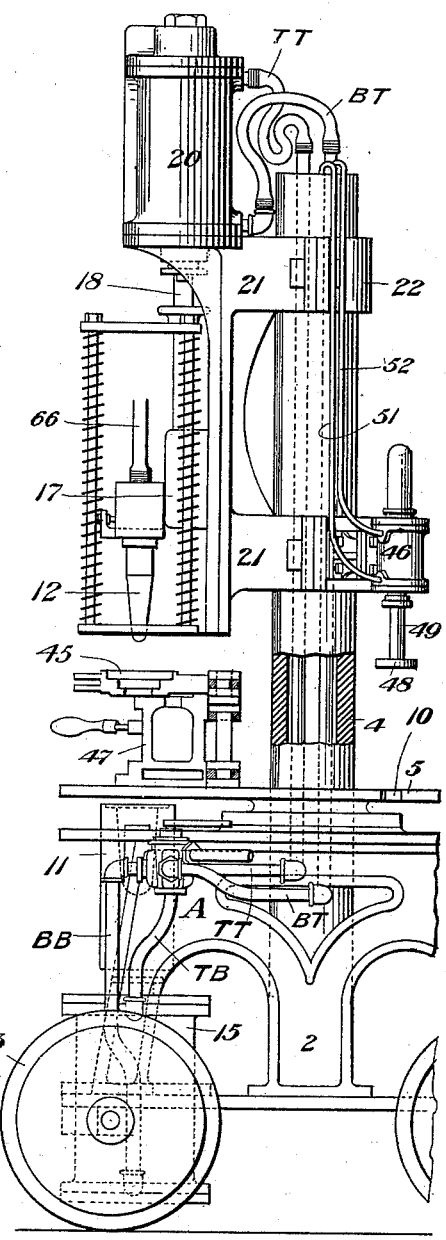
Figure 6:
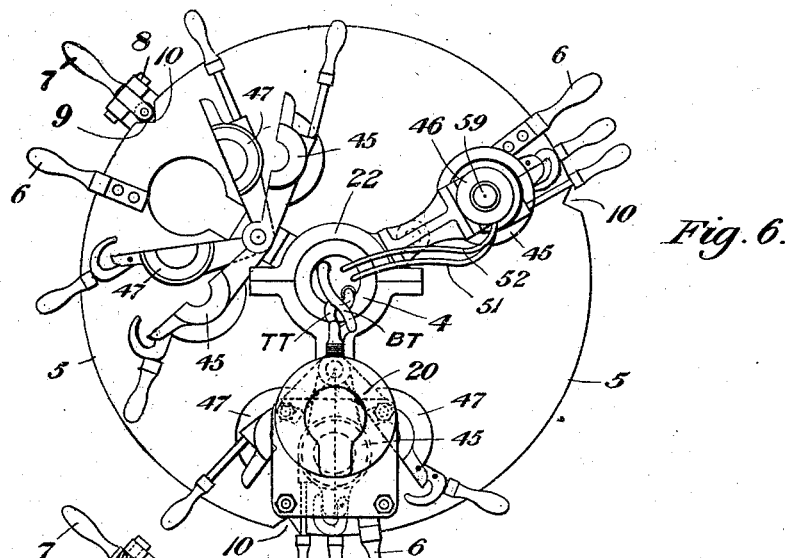
Figure 7:
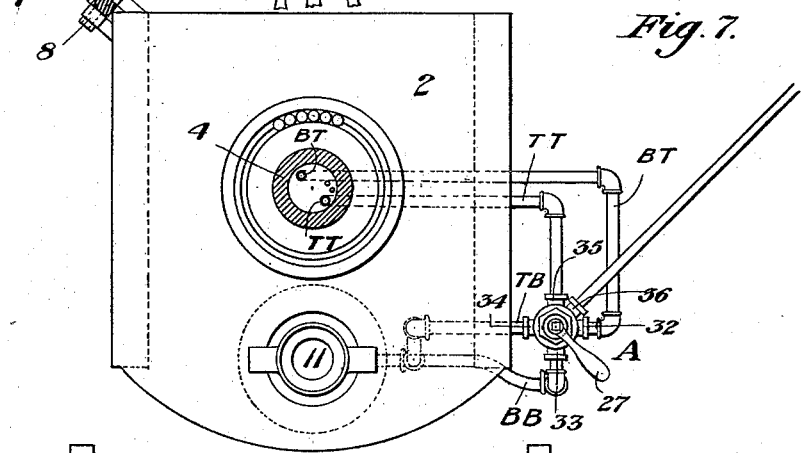
Figure 8:
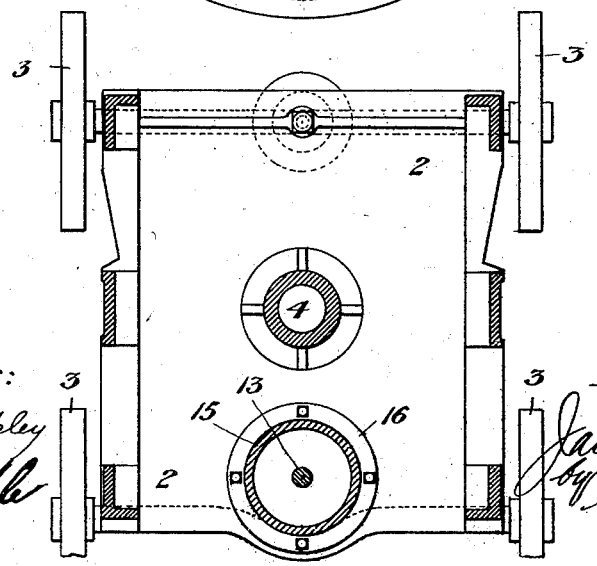
Figure 14:
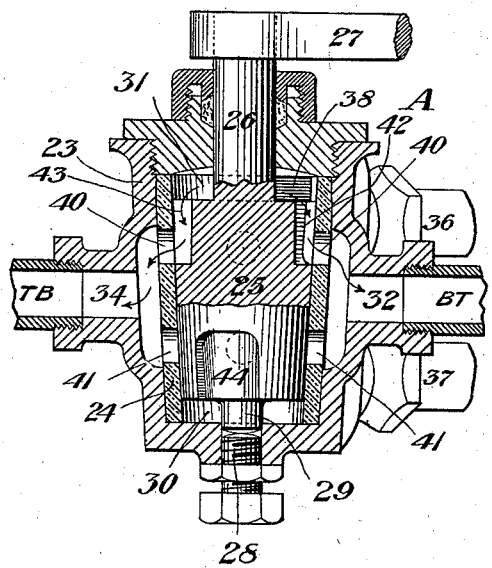
Figure 15:
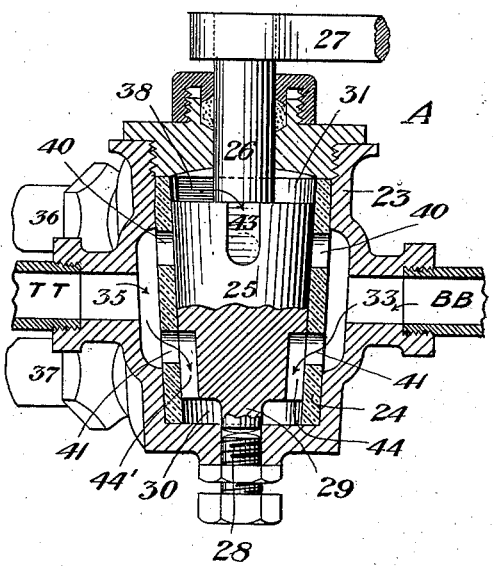
Figure 16:
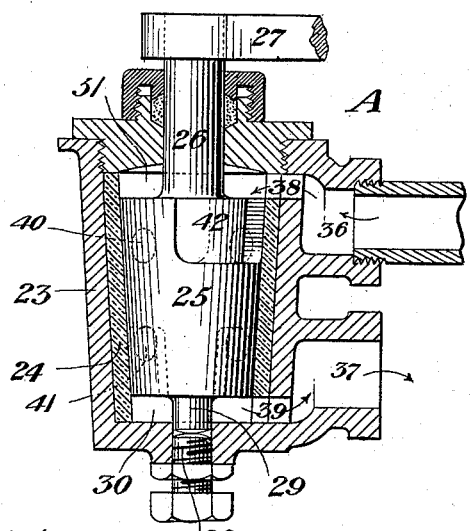
Figure 17:
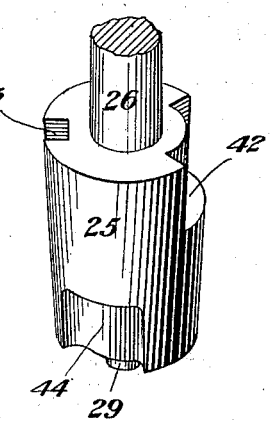

Figure 1 is a view in side elevation of my improved glass-pressing machine, showing the parts in position for commencing the first operation. Fig. 2 is a similar portion view from the opposite side, showing the controlling-valve and its connections. Fig. 3 is a front elevation of the machine. Fig. 4 is a vertical sectional view, on an enlarged scale, of the upper or pressing cylinder. Fig. 5 is a similar view of the lower or lifting cylinder. Fig. 6 is a plan view. Fig. 7 is a horizontal sectional view taken on the line VII VII of Fig. 3. Fig. 8 is a similar view taken on the line VIII VIII of Fig. 3. Figs. 9 and 10 are detail sectional views, on an enlarged scale, of the blowing-cylinder, showing the same in raised and lowered positions, respectively. Figs. 11, 12, and 13 are diagrammatic plan views of the controlling-valve, illustrating the handle of the same in three successive positions of the pressing and lifting cylinders, respectively. Figs. 11$^a$, 12$^a$, and 13$^a$ are sectional diagrammatic views of the controlling-valve and connections therefrom to the pressing-cylinder, showing the circulation thereto and the positions of the valve and piston of such cylinder, respectively, corresponding to the positions of the valve-handle illustrated in Figs. 11, 12, and 13. Figs. 11$^b$, 12$^b$, and 13$^b$ are similar views showing the connections from the controlling-valve to the lifting-cylinder, the controlling-valve being shown in section, so as to expose the exhaust-port thereof. Fig. 14 is a transverse vertical section of the controlling-valve on an enlarged scale, the section being indicated by the line XIV XIV of Fig. 11$^a$ and in a position corresponding to the first position of the valve, as shown in Fig. 11. Fig. 15 is a similar view at right angles to Fig. 14, indicated by the line XV XV of Fig. 11$^a$, the position of the valve being the same. Fig. 16 is a similar view indicated by the line XVI XVI of Fig. 11$^a$, the valve being still in the same position, the section illustrating the supply and exhaust connections, respectively. Fig. 17 is a detail perspective view of the valve-plug. Fig. 18 is a sectional view of the plunger and its connections.

My invention relates to apparatus for forming articles such as bottles, &c.; and it has for its object to perform the operations necessary in such work, which have heretofore been accomplished manually or through various mechanical operations by means of compressed air or other suitable fluid-pressure.

Referring to the drawings, wherein my invention is illustrated as applied to a glass-pressing machine, 2 is the main frame or base, preferably mounted upon wheels 3, with which base is incorporated in any suitable manner a central cylindrical hollow mast or column 4, around which rotates the table 5, resting upon suitable bearings, preferably ball-bearings, supported upon the base 2. This rotatable table is provided with handles 6, secured to the periphery of the table, by which it is rotated. It is locked in the various operative positions by means of a locking-handle 7, pivotally mounted in the base at 8, provided with a roller 9, adapted to enter V-grooves 10 in the rotating table 5 and to be held thereon by pressure of any suitable spring or other device. As thus constructed this locking-handle may be withdrawn and the table rotated, or the table may be rotated without first withdrawing the lock by using sufficient pressure to automatically force it out of engagement and automatically reëngaging the next successive V-groove.

The table 5 is designed in the present machine to rotate one-third of a revolution, whereby the molds, of usual construction, mounted thereon are brought successively into position for the various steps of the operation. The first step is to form the blank in the blank-mold 11 at the front of the machine, such mold being adjustably mounted in vertical alinement with a vertical reciprocating plunger 12, which plunger is preferably forced down by an internal current of air, as I shall hereinafter describe.

The blank-mold 11 is mounted in suitable guideways in the main frame of the machine upon the upper end of a piston-rod 13, to which it is attached, the piston 14 of which is mounted in a cylinder 15, resting, by convenient flanges or brackets 16 or other suitable supporting means, upon the main frame of the machine, as clearly shown.

The plunger 12 is secured to a reciprocating cross-head 17, mounted in a suitable guiding-frame, and is secured to the lower end of the piston-rod 18, the piston 19 of which is within the pressing-cylinder 20, such cylinder, as well as the guides for the cross-head 17 and the other usual portions commonly employed in machinery of this type, being mounted upon a supporting frame structure 21, adapted to be secured in any desired position upon the mast 4 by means of caps 22, securely held around the mast and in binding contact therewith by bolts, as shown.

A represents a controlling-valve for the purpose of regulating the supply of air to or exhaust from cylinders 15 and 20, the valve being located in convenient position at the side of the machine for operation by the workman. Such valve consists of an outer shell 23, provided with an interior bushing 24, within which is rotatably mounted a tapered plug 25, the stem 26 of which extends upwardly through a suitable stuffing-box and is provided with a suitable handle 27. The plug is adjustably held in rotatable position within the bushing by means of any suitable bearing device, as a set-screw 28, against which a terminal stem 29 bears, leaving an annular space 30 around the lower end of the valve-plug. Above the valve-plug and within the bushing is a similar annular space 31, and by means of such annular space at each end free circulation of the supply and exhaust currents of air is provided. Regularly arranged at equal distances from each other around the shell or case 23 of the valve are inlet and outlet connections 32 33 34 35, while midway between the connections 32 and 35 are located a common supply-passage 36 and a common exhaust-passage 37, respectively, the supply-passage 36 communicating through the port 38 with the upper annular chamber 31, wherein a constant supply-pressure is maintained. The common exhaust-passage 37 communicates by port 39 with the annular exhaust-chamber 30, from which exhaust-pressure may be taken at all times and preferably discharged through passage 37 to the atmosphere. Each of the inlet and outlet passages 32, 33, 34, and 35, which are located about midway of the valve-shell, communicates with the upper and lower ports 40 and 41 through the bushing and through such of the ports of the valve-plug 25 as are brought in register therewith with the annular supply-chamber 31 and the lower annular exhaust-chamber 30. The plug 25 is provided at its upper peripheral portion with a recessed port 42, which covers one-quarter of its circumference and which is capable of communication with any two of the adjacent supply-ports 40, while on the opposite side is a similarly-recessed port 43 of only sufficient width to communicate with any one of such ports. The lower peripheral surface of the valve-plug 25 is provided with similar recessed ports 44 and 44', oppositely located to each other and of sufficient width to be maintained in independent register with two only of the exhaust-ports 41 and to maintain communication with such ports during and throughout a one-eighth revolution of the plug, as indicated in the diagrammatic views on Sheet No. 5 of the drawings. As thus constructed this portion of the valve constitutes a double-ended plug, by means of which communication may be had from the general supply to the particular supply pipe leading from the valve-chamber, as desired, or from particular exhaust-ports leading from such particular pipes or others to the common exhaust-chamber 30 and from there to the atmosphere, as desired. By reason of such construction and arrangement of the various parts I am enabled to provide supply and exhaust circulation for accomplishing the different operations of the machine, and it will be understood that the valve as so constructed is capable of all such combinations and arrangements, as is clearly illustrated in the drawings, and the valve, while in its integrity is a single valve, is capable of performing the functions of both a supply and exhaust valve for the two cylinders within the scope of the single operation of it.

In the operation of pressing the glass in the press-mold 11 the glass is first placed in such pressing-mold in its lowered position, as shown in Fig. 3, during which operation the mold is maintained in a lowered position by gravity, the valve A being in its normal initial position, as illustrated in Figs. 11, 11$^a$, and 11$^b$ of Sheet 5 of the drawings. The piston and connected plunger of the pressing-cylinder 20 are likewise maintained in a normally raised position, as shown, by air-pressure, and such positions of the two cylinders are maintained continuously until the valve is changed to the position shown in Figs. 12, 12$^a$, and 12$^b$.

For the purpose of supplying pressure to and of exhausting air from the bottom cylinder 15 a pipe B B leads from valve connection 33 to the bottom of the bottom cylinder, while from connection 34 of the valve a pipe T B leads to the top of the bottom cylinder. From connection 32 of the valve a pipe B T leads to the bottom of the top cylinder, and from connection 35 a pipe T T leads to the top of the top cylinder. When the valve is in the normal position, (shown in Fig. 11,) pressure will be established through such connections by way of ports 43 and 40 to the top of the piston 15, keeping the mold 11 lowered and opening free exhaust from underneath the piston through connection 33, port 44, chamber 30, and port 39, and the general exhaust-port 37. In a similar manner pressure is supplied, by way of ports 42 and 40, through connection 32 and pipe B T, to the lower side of the piston 19, keeping such piston and plunger raised, while exhaust from the upper side passes through pipe T T, ports 41 and 44' to the atmosphere. In the second operation of the valve, as illustrated in Figs. 12, 12$^a$, and 12$^b$, the mold 11 is raised by admitting pressure through ports 42 and 40, connections 33, and pipe B B, exhaust being established through pipe T B, connections 34, ports 41 and 44 to annular chamber 30, and therefrom to the common outlet; but during such raised action of the mold 11 the plunger is still maintained raised, such one-eighth movement of the valve continuing to maintain the original communication already described through the same ports by reason of the width of recessed ports 42 and 44'. In the third position of the valve (shown in Figs. 13, 13$^a$, and 13$^b$) the mold-cylinder is still maintained in a raised position by reason of the continuation of the pressure communication already described through ports 42 and 40, connections 33, and pipe B B, such movement of the valve, however, reversing the condition as to the top cylinder and admitting pressure through ports 43 and 40, connections 35, and pipe T T to the top of piston 19, exhaust from underneath the piston passing outwardly from pipe B T, connections 32, ports 41 and 44', annular chamber 30, and ports 39, and general exhaust-passage 37 to the atmosphere, by which operation the plunger 12 is lowered in the mold 11, performing the pressing action within such mold, forcing the blank into the neck-mold 45 in the usual way. The valve is then reversed to the middle position, raising plunger 12, and by a further movement of the valve back to the first position the press-mold 11 is lowered, leaving the blank suspended from the neck-mold, or such operations may be performed simultaneously by at once turning the valve back to the first position. The table 5 is then rotated one-third of a revolution, bringing the neck-mold and blank underneath the blowing-cylinder 46. The blow-mold 47 is then placed around the suspended blank, and disk 48, attached to piston-rod 49 of the blowing-cylinder, is lowered onto the top of the neck-mold by admitting air to the upper side of piston 50 within such cylinder 46. This operation is performed by means of a four-way valve B, located in convenient position on the frame of the machine, from which valve pipes 51 and 52 lead to the bottom and top of blowing-cylinder 46, respectively. The piston 50 of such cylinder 46 is normally held raised by pressure communication through its pipe 51, the lever of valve B being normally kept raised, as shown in Fig. 1, by means of spring 53, attached at the upper end of the frame of the machine and connected to treadle-lever 54, so to hold it raised, the treadle being pivoted at 55 and being provided with a connecting-rod 56 to the arm 57 of valve B. When it is desired to lower disk 48 upon the top of the neck-mold, the workman depresses the treadle, when the circulation is reversed and pressure is established above the piston 50, accomplishing the operation.

It will be seen that the piston-rod 49 and disk 48 are hollow, a central port 58 terminating above the piston and within an extended coping 59, by which means the actuating current of air in the operation of lowering the piston will also pass downwardly through port 58 into the interior of the plunger-cavity of the blank as soon as the top of port 58 has been lowered below the packing 49', at which point the disk 48 is just about to be seated on the neck-mold. Such air-pressure will finish the operation by blowing the blank within the blow-mold 47, at the end of which operation the treadle is released, piston 50 and its connected parts are raised, the table is rotated a further one-third revolution, and the finished article is removed in the usual manner, the other operations being continuously carried on at the other positions of the table.

For the purpose of holding the piston 50 and its parts raised independent of the air-pressure I have provided a spring-clip 60 at the upper end of the coping 59, which clip engages a button 61 on the top of the extended piston-rod, but with not sufficient grip to interfere with the lowering operation of the air-current.

For the purpose of providing means for preventing excessive pressing action of the plunger 12 or undue upward pressure of the mold 11 I have provided release devices for the top and bottom of air-cylinders 20 and 15, which consist in release-valves 62 and 63, mounted in the top and bottom of each cylinder, respectively, as shown, and adapted to establish communication from either end of the piston to the other at a certain predetermined time with relation to its stroke, whereby the pressure on both sides of the pistons 19 and 14 is equalized, such provision checking the movement and preventing the cracking of the glass. Each of the valves 62 and 63 opens outwardly into a common communicating passage 64 in the heads and side of the cylinders, and for the purpose of overcoming gravity, so as to keep the valve 63 always in its seat, a weak coiled spring 65 is inserted beneath it.

In operation, as when pressure is admitted above the piston, such pressure will lift valve 62 from its seat, and at the desired termination of the downstroke of the piston it will come into contact with the extended stem of the valve 63, unseating it and allowing pressure to pass from passage 64 to the under side of the piston, such pressure being equal to the amount of that above the piston and accomplishing the desired results. The operation is the same as to the reverse movement and as to the bottom cylinder also. The crossarea of passage 64 is approximately double that of the supply and exhaust pipes or even greater, if desired, so that the flow through such passage will be free and instantaneous and not drained by either of such pipes. It will be seen that the stroke of each cylinder is terminated automatically and independent of the movement of the valve by the operator, thus eliminating the necessity of special skill, which has heretofore been an important element in apparatus of this character. It will be noted that the cylinder 20 and its connected parts are adjustably mounted upon the mast 4, and the connections from the pipes connecting this cylinder with the valve A are preferably made flexible by the use of rubber pipes, as clearly shown at the upper end of Figs. 1 and 2.

The main pipes B T and T T are conveniently located within the hollow mast, whereby there is no interference with the working parts of the apparatus. The cylinder 46, which occupies a corresponding relation to the top of the neck-mold as does the plunger 12, and which should therefore be mounted in such varying vertical position with relation to the varying position at which the neck-mold may be located, is therefore rigidly mounted, by means of a bracket, upon the lower cap 22 of the main frame 21, whereby it is fixedly secured with relation to the main frame. The connections 51 and 52 from valve B are also preferably introduced within the interior of the hollow mast, taken up through it and out of the top, as shown in Fig. 2, and these connections are also made of flexible tubing or otherwise to permit of the raising and lowering adjustment of the cylinder 46 with relation to the stationary mast and other parts of the machine. Likewise the connections 66 to the hollow plunger 12, for the purpose of supplying a current of cooling air, may lead to and be connected with the plunger in any suitable manner and is also preferably made flexible, as indicated in Fig. 3. This plunger is held upon the cross-head 17 by means of a dovetail slide 67 or other convenient means, upon which is secured a plug 68, upon which plug is in turn secured the upper end of the plunger 12, such plunger being provided with a central space or cavity 69, which extends downwardly to within a short distance of its point. Secured in the lower side of the plug 68 is a pipe 70, the lower end of which terminates at or upon the bottom of the plunger and the central opening of which is in communication with air-passages 71 and 72 through the slide 67 and cross-head 17, at the top of which the flexible connection 66 is attached. As thus constructed a current of cold air is always delivered at the point of the plunger and will keep it comparatively cool during the pressing action, which is a desirable feature of advantage in apparatus of this kind.

The advantages of my invention will be appreciated by those skilled in the art, as it provides a machine for pressing and blowing glassware which entirely obviates the necessity of manual labor to perform the various functions of the machine, and such manual actions as are necessary as to the manipulation of the mold and the rotation of the table are of such character as not to require unusual energy. The pressing action is thus rendered easy and comparatively independent of the usual necessary skill, thus rendering the machine more entirely available for the objects in view.

While the construction and arrangement of the various parts as I have shown and described them are such as to give good results in practice, I do not desire to be confined thereto, but to include all such changes and modifications therefrom as are more properly within the province of the skilled mechanic and not necessarily specific elements of the invention, and it will be understood that I do not desire to be limited to such exact construction as shown and described, but to include all such changes and variations therefrom as are within the scope of the following claims.

What I claim is—

1. In apparatus for forming glass articles, the combination of a rotating mold-carrier, a press-mold, a press-mold cylinder, a plunger-cylinder in alinement with the press-mold cylinder, a plunger, and a single valve for controlling the supply and exhaust of fluid to and from each end of said cylinders.

2. In apparatus for forming glass articles, the combination of a rotating mold-carrier, a press-mold, a press-mold cylinder, a plunger-cylinder in alinement with the press-mold cylinder, a plunger, means for controlling the supply and exhaust of fluid to and from said cylinders consisting of a single element, and intervening connections therefrom to each end of each cylinder.

3. In apparatus for forming glass articles, the combination of a rotating mold-carrier, a press-mold, a press-mold cylinder, a plunger-cylinder in alinement with the press-mold cylinder, a plunger, a blowing-cylinder situate above the carrier, a valve for controlling the supply and exhaust of fluid to and from each end of the press-mold cylinder and plunger-cylinder respectively, and a valve for controlling the supply and exhaust to and from the blowing-cylinder.

4. In apparatus for forming glass articles, the combination of a main frame provided with a horizontal rotating mold-supporting table, a press-mold, a cylinder provided with a piston attached to and supporting the press-mold, a plunger-cylinder situate above the press-mold cylinder provided with a piston connected with a plunger, a controlling-valve, and connections therefrom to each end of each cylinder for supplying intermittent fluid-pressure to said cylinders.

5. In apparatus for forming glass articles, the combination of a main frame provided with a horizontal mold-supporting table, a press-mold cylinder adapted to actuate a press-mold, a plunger-cylinder situate above the press-mold cylinder adapted to actuate a plunger, means for establishing a cushioning pressure in the cylinders, and means for supplying intermittent fluid-pressure to the cylinders.

6. In apparatus for forming glass articles, the combination of a main frame provided with a horizontal mold-supporting table, a press-mold cylinder provided with a piston supporting the press-mold, a plunger-cylinder situate above the press-mold cylinder provided with a piston connected with a plunger, means for establishing a cushioning pressure in the cylinders, and means for supplying intermittent fluid-pressure to each end of each cylinder, substantially as set forth.

7. In apparatus for forming glass articles, the combination of a main frame, a press-mold cylinder mounted thereon adapted to operate a press-mold vertically, a central mast supporting a plunger-cylinder above the press-mold cylinder, and a valve with connections therefrom to the top and bottom of the press-mold cylinder and the plunger-cylinder respectively, so as to establish therein intermittent fluid-pressure, substantially as set forth.

8. In apparatus for forming glass articles, the combination of a main frame, a press-mold cylinder mounted thereon adapted to operate a press-mold vertically, a central hollow mast supporting a plunger-cylinder above the press-mold cylinder, and a valve with connections therefrom to the top and bottom of the press-mold cylinder and the plunger-cylinder respectively, so as to establish therein intermittent fluid-pressure, such connections from the valve to the plunger-cylinder passing upwardly through the hollow mast, substantially as set forth.

9. In apparatus for forming glass articles, the combination of a main frame provided with a central mast, a press-mold cylinder mounted upon the main frame adapted to operate a press-mold vertically, a plunger-cylinder adjustably mounted upon the mast, and supporting a plunger in alinement with the press-mold, a controlling-valve, and means for supplying intermittent pressure therefrom to each end of each cylinder, substantially as set forth.

10. In apparatus for forming glass articles, the combination of a main frame provided with a central mast, a press-mold cylinder mounted upon the main frame, adapted to operate a press-mold vertically, a vertically-adjustable frame mounted upon the mast supporting a plunger-cylinder, the plunger, and its connected mechanism; and a controlling-valve with connections therefrom to each end of the press-mold cylinder and plunger-cylinder respectively, so as to establish therein intermittent fluid-pressure, substantially as set forth.

11. In apparatus for forming glass articles, the combination of a main frame provided with a central mast, a press-mold cylinder mounted in the main frame, adapted to operate a press-mold vertically, a supporting-framework adjustably mounted upon the hollow mast, carrying the plunger-cylinder, a plunger, and its connected mechanism, a blowing-cylinder rigidly connected with the framework, a controlling-valve with connections therefrom to each end of the press-mold cylinder and plunger-cylinder respectively, so as to establish therein intermittent fluid-pressure, and a valve with connections to the blowing-cylinder, substantially as set forth.

12. In apparatus for forming glass articles, the combination of a main frame provided with a central hollow mast, a press-mold cylinder mounted in the main frame adapted to operate a press-mold vertically, a supporting-framework adjustably mounted upon the hollow mast, carrying the plunger-cylinder, a plunger, and its connected mechanism; a blowing-cylinder rigidly connected with the framework, a controlling-valve with connections to the blowing-cylinder, the connections to and from the valve to the blowing-cylinder being located within the hollow mast, substantially as set forth.

13. In apparatus for forming glass articles, the combination of a main frame provided with a central hollow mast, a press-mold cylinder mounted in the main frame, adapted to operate a press-mold vertically; a supporting-framework adjustably mounted upon the hollow mast, carrying a plunger-cylinder, a plunger, and its connected mechanism; a blowing-cylinder rigidly connected with the framework; a controlling-valve with connections to the blowing-cylinder within the hollow mast, such connections being provided with flexible connecting portions whereby the cylinder may be adjusted with relation to the valve, substantially as set forth.

14. In apparatus for forming glass articles, the combination of a main frame, provided with a central mast, a rotatable mold-supporting table mounted upon the main frame, a press-mold cylinder supported in the frame adapted to operate a press-mold vertically, a supporting-framework adjustably mounted upon the mast carrying a plunger-cylinder, a plunger, and its connected mechanism; means for establishing intermittent fluid-pressure in the plunger-cylinder, and press-mold cylinder, and a blowing-cylinder rigidly connected with the framework; a controlling-valve; connections therefrom to the blowing-cylinder, and a treadle device for operating such valve, substantially as set forth.

15. In apparatus for forming glass articles, the combination of a main frame provided with a central mast, a rotatable mold-supporting table mounted upon the main frame, a press-mold cylinder supported in the frame adapted to operate a press-mold vertically, a supporting-framework adjustably mounted upon the mast carrying a plunger-cylinder; a plunger, and its connected mechanism;

means for establishing intermittent fluid-pressure in the plunger-cylinder and press-mold cylinder; a blowing-cylinder rigidly connected with the framework; a controlling-valve, connections therefrom to the blowing-cylinder, a treadle device for operating such valve, a controlling-valve for both mold-cylinder and plunger-cylinder, and connections from such valve to such cylinders, substantially as set forth.

16. In apparatus for forming glass articles, the combination of a main frame provided with a central hollow mast, a rotatable mold-supporting table mounted upon the main frame, a press-mold cylinder supported on the frame adapted to operate a press-mold vertically, a supporting-framework adjustably mounted upon the hollow mast carrying a plunger-cylinder, a plunger, and its connected mechanism; means for cooling the plunger, a blowing-cylinder rigidly connected with the framework, a controlling-valve, connections therefrom to the blowing-cylinder, a treadle device for operating such valve, a controlling-valve for both the mold and plunger cylinders, so as to establish therein intermittent fluid-pressure, and connections from such valve to such cylinders, substantially as set forth.

17. In apparatus for forming glass articles, the combination of a main frame, a press-mold cylinder mounted thereon adapted to operate a press-mold vertically, a plunger-cylinder situate above the press-mold cylinder provided with a piston connected with the plunger, such plunger being in alinement with the press-mold, means for supplying fluid-pressure to the cylinders, and means located at each end of each cylinder for equalizing the pressure therein at the termination of the stroke, substantially as set forth.

18. In apparatus for forming glass articles, the combination of a main frame, a press-mold cylinder mounted thereon adapted to operate a press-mold vertically, a central mast, a framework adjustably mounted thereon, a plunger-cylinder supported upon the framework above the mold-cylinder, a controlling-valve with connections to the mold-cylinder and plunger-cylinder respectively, and a blowing-cylinder mounted upon the framework provided with a seating device, adapted to be adjusted upon a blow-mold and to deliver air-pressure thereto, a valve controlling the operation of such device, and connections from such valve to the blowing-cylinder, whereby air-pressure is supplied to it for the purposes set forth.

19. In apparatus for forming glass articles, the combination of a main frame provided with a central hollow mast, a rotatable mold-supporting table mounted upon the main frame, a blowing-cylinder adjustably mounted upon the mast and adapted to aline with the molds of the table, such blowing-cylinder being provided with a piston having a hollow stem and a perforated disk adapted to be set upon a blow-mold, air-pressure connections to the blowing-cylinder whereby its piston is raised or lowered and whereby pressure is established through the hollow stem in the blow-mold; a controlling-valve in communication with the connections to the blowing-cylinder, and treadle mechanism for actuating the controlling-valve, substantially as set forth.

20. In apparatus for forming glass articles, the combination of a main frame provided with a central hollow mast, a rotatable mold-supporting table mounted upon the main frame, a blowing-cylinder adjustably mounted upon the mast and adapted to aline with the molds of the table, such blowing-cylinder being provided with a piston having a hollow stem, means for holding such stem in a raised position independent of the air-pressure, a disk at the lower end of the hollow stem adapted to be set upon the blow-mold, air-pressure connections with the blowing-cylinder whereby its piston is raised or lowered, and whereby pressure is established through the hollow stem in the blow-mold, and a controlling-valve in communication with the connections to the blowing-cylinder, substantially as set forth.

In testimony whereof I affix my signature in presence of two witnesses.

JAMES A. ARNOLD.

Witnesses:
  THOS. M. BROWN,
  C. M. CLARKE.